(12) United States Patent
Patoux et al.

(10) Patent No.: US 7,879,264 B2
(45) Date of Patent: Feb. 1, 2011

(54) COMPOUND BASED ON TITANIUM DIPHOSPHATE AND CARBON, PREPARATION PROCESS, AND USE AS AN ACTIVE MATERIAL OF AN ELECTRODE FOR A LITHIUM STORAGE BATTERY

(75) Inventors: Sebastien Patoux, Fontaine (FR); Carole Bourbon, Saint-Michel de Saint-Geoirs (FR)

(73) Assignee: Commissariat a l'Energie Atomique, Paris (FR)

( * ) Notice: Subject to any disclaimer, the term of this patent is extended or adjusted under 35 U.S.C. 154(b) by 47 days.

(21) Appl. No.: 12/224,651

(22) PCT Filed: Mar. 13, 2007

(86) PCT No.: PCT/FR2007/000435

§ 371 (c)(1), (2), (4) Date: Sep. 3, 2008

(87) PCT Pub. No.: WO2007/110495

PCT Pub. Date: Oct. 4, 2007

(65) Prior Publication Data

US 2009/0026413 A1    Jan. 29, 2009

(30) Foreign Application Priority Data

Mar. 27, 2006    (FR) .................................. 06 02647

(51) Int. Cl.
    *H01B 1/06*    (2006.01)
(52) U.S. Cl. .................. 252/520.2; 252/521.5; 423/305
(58) Field of Classification Search .............. 252/520.2, 252/521.5; 423/69, 305; 429/218.1
See application file for complete search history.

(56) References Cited

U.S. PATENT DOCUMENTS

| | | | | |
|---|---|---|---|---|
| 4,292,345 A * | 9/1981 | Kolesnik et al. | ............. | 427/113 |
| 5,733,519 A * | 3/1998 | Gard | .......................... | 423/305 |
| 5,910,382 A | 6/1999 | Goodenough et al. | | |
| 6,114,427 A * | 9/2000 | Gard | .......................... | 524/413 |
| 2002/0195591 A1 | 12/2002 | Ravet et al. | | |
| 2004/0175614 A1 | 9/2004 | Wurm et al. | | |
| 2007/0224483 A1 * | 9/2007 | Alberti et al. | ................. | 429/33 |

FOREIGN PATENT DOCUMENTS

| | | |
|---|---|---|
| EP | 1 049 182 A2 | 11/2000 |
| WO | WO 02/099913 A1 | 12/2002 |
| WO | WO 2004/001881 A2 | 12/2003 |

OTHER PUBLICATIONS

Patoux et al.; "Lithium Insertion into Titanium Phosphates, Silicates, and Sulfates"; *Chem. Mater.*; 2002; pp. 5057-5068; vol. 14; American Chemical Society.

(Continued)

*Primary Examiner*—Mark Kopec
(74) *Attorney, Agent, or Firm*—Oliff & Berridge, PLC

(57) ABSTRACT

A compound containing titanium diphosphate $TiP_2O_7$ and carbon covering at least part of the surface of the $TiP_2O_7$ particles presents properties which make it suitable for use as active material of an electrode for a lithium storage battery. A compound of this kind is prepared more particularly by mixing at least one first precursor containing the titanium element with a +4 oxidation state, a phosphorus-based second precursor and an organic precursor containing the carbon element. The mixture then undergoes heat treatment at a temperature of between 500° C. and 800° C. in an inert atmosphere.

13 Claims, 4 Drawing Sheets

OTHER PUBLICATIONS

Shi et al.; "Synthesis and characterization of mesoporous titanium pyrophosphate as lithium intercalation electrode materials"; *Microporous and Mesoporous Materials*; 2006; pp. 232-237; vol. 88; Elsevier Inc.

Uebou et al.; "Cathode properties of pyrophosphates for rechargeable lithium batteries"; *Solid State Ionics*; 2002; pp. 323-328; vol. 148; Elsevier Inc.

Barker et al.; "A Carbothermal Reduction Method for the Preparation of Electroactive Materials for Lithium Ion Applications"; *Journal of Electrochemical Society*; 2003; pp. A684-A688; vol. 150, No. 6; The Electrochemical Society.

Barker et al.; "Lithium Ion(II) Phospho-olivines Prepared by a Novel Carbothermal Reduction Method"; *Electrochemical and Solid-State Letters*; 2003; pp. A53-A55; vol. 6, No. 3; The Electrochemical Society.

Wurm et al.; "Lithium Insertion/Extraction into/from $LiMX_2O_7$ Compositions (M=Fe, V; X=P, As) Prepared via a Solution Method"; *Chem. Mater.*; 2002; pp. 2701-2710; vol. 14; American Chemical Society.

* cited by examiner

US 7,879,264 B2

COMPOUND BASED ON TITANIUM DIPHOSPHATE AND CARBON, PREPARATION PROCESS, AND USE AS AN ACTIVE MATERIAL OF AN ELECTRODE FOR A LITHIUM STORAGE BATTERY

BACKGROUND OF THE INVENTION

The invention relates to a compound containing titanium diphosphate and carbon, a preparation method and use of such a compound.

STATE OF THE ART

Lithium storage batteries are tending to replace nickel-cadmium (Ni—Cd) or nickel-metal hydride (Ni—MH) storage batteries as autonomous power sources, in particular in portable equipment. The performances, and more particularly the mass energy density of lithium storage batteries, are in fact higher than those of rechargeable Ni—Cd and Ni—MH batteries.

Lithium storage batteries are based on the principle of insertion and extraction of $Li^+$ cations into/from at least one active material of an electrode.

The negative electrode of lithium storage batteries may generate $Li^+$ ions or it may contain a lithium insertion active material. The choice of the material forming the negative electrode enables lithium storage batteries to be classified in two major categories of lithium storage batteries: Li-ion systems with a liquid or solid electrolyte (of polymer type), and Li-Metal systems comprising a negative electrode made of metallic lithium and generally a polymer electrolyte. The active material of the negative electrode can thus be chosen from metallic lithium, a lithium alloy, a nanometric mixture of a lithium alloy in a lithium oxide, a lithium and transition-metal nitride or from a lithium intercalation or insertion material such as carbon in graphite form or a material of spinel structure of $Li_4Ti_5O_{12}$ type.

The positive electrode for its part comprises at least one material able to insert a certain number of $Li^+$ cations in reversible manner in its structure, such a material also being called lithium insertion material.

Since the emergence of lithium storage batteries, several generations of lithium insertion materials and in particular of active materials of positive electrodes have successively made their appearance.

Lithium and transition-metal oxides such as oxides of lamellar structure such as $LiCoO_2$ and $LiNiO_2$ and such as oxides of spinel structure such as $LiMn_2O_4$ are indeed known. The theoretical and practical mass capacitances of these compounds, for an operating voltage with respect to metallic lithium of about 4 Volts, are respectively 275 mAh/g and 140 mAh/g for $LiCoO_2$ and $LiNiO_2$ and 148 mAh/g and 120 mAh/g for $LiMn_2O_4$.

The concept of lithium insertion and extraction into/from electrode materials was extended a few years ago to three-dimensional structures constructed from polyanion entities of $XO_n^{m-}$ type, with X=P, S, Mo, W ...

To increase the insertion potential of the active materials of the positive electrode, it has thus been proposed to replace lithium and transition-metal oxides by materials having an ordered olivine structure, for example $LiMPO_4$, or by materials having a NASICON type structure, for example $Li_xM_2(PO_4)_3$, M being a metal (U.S. Pat. No. 5,910,382). This type of materials does in fact present the advantage of being not only less expensive but also more stable in charged state and in the presence of the electrolyte, such as the lithium and transition-metal oxides usually used. Furthermore, the materials having an ordered olivine structure or of NASICON type are non-toxic. Lithiated iron phosphate, $LiFePO_4$, is for example a compound that is increasingly used to form an active compound of a positive electrode, in particular in developing fields such as the hybrid automobile field. $LiFePO_4$ presents a theoretical specific capacitance of 170 mAh/g for an operating potential of 3.4 Volts with respect to the potential of the $Li/Li^+$ couple.

Recently, certain studies have been made on the lithium insertion and extraction capacities into/from diphosphate-base compounds. For example, in the article "Lithium Insertion/Extraction into/from $LiMX_2O_7$ compositions (M=Fe, V; X=P, As) prepared via a solution method" (Chem. Mater. 2002. 14, 2701-2710), C. Wurm et al. evaluated the potential of the $LiFeP_2O_7$, $LiFeAs_2O_7$ and $LiVP_2O_7$ compounds as active electrode materials in rechargeable lithium storage batteries. The compounds are prepared by mixing soluble precursors in demineralized water and then performing slow evaporation under continuous stirring until the mixture is dry. The dry mixture then undergoes heat treatment at a temperature comprised between 300° C. and 800° C.

Studies dealing with the use of titanium diphosphate ($TiP_2O_7$) as electrode active material have also been carried out. Thus, S. Patoux et al., in their article "Lithium Insertion into Titanium Phosphates, Silicates and Sulfates" (Chem Mater. 2002. 14, 5057-5068) studied the use of silicates, sulfates and phosphates containing titanium in a +4 oxidation state, as active materials of positive electrodes in lithium storage batteries. They found that $TiP_2O_7$ could be an interesting positive electrode material for Li-Metal type lithium batteries comprising a polymer electrolyte and a negative electrode made of lithium, with an operating voltage of 2.5-2.6 Volts. Li-Metal type lithium storage batteries do in fact present the advantage of having a negative electrode made of metallic lithium. The active material of the positive electrode therefore does not need to be initially lithiated. In this case, the $Li^+$ ions are initially provided by the negative electrode and inserted in the positive electrode during the first discharge of the lithium storage battery. The electrochemical process is perfectly reversible in Li-Metal type storage batteries as the $Li^+$ ions can circulate from the negative electrode to the positive electrode and vice-versa.

However, in the article "Cathode properties of pyrophosphates for lithium storage batteries" (Solid State Ionics (2002) 323-328), Y. Uebou et al. show that, in titanium diphosphate ($TiP_2O_7$), only 0.6 Li per unit can be inserted in $TiP_2O_7$ at a potential of 2.6 V compared with the potential of the $Li/Li^+$ couple (2.6 V vs $Li/Li^+$). The $TiP_2O_7$ compound was synthesized by reaction in solid state at a temperature of about 700° C. for a period of 12 to 24 hours and in air. Such a compound therefore presents a weak intrinsic electron conductivity, which limits the lithium insertion and extraction kinetics in the structure and the use of these compounds in relatively low charge and discharge conditions.

Moreover, phosphates in general and more particularly diphosphates, present the drawback of being insulating from an electronic point of view.

To improve the electronic conductivity of the material forming a positive electrode, it is known to mix the phosphate-base compound intimately with carbon. Thus, in the article "Lithium Insertion/Extraction into/from $LiMX_2O_7$ compositions (M=Fe, V; X=P, As) prepared via a solution method" by C. Wurm et al., the $LiFeP_2O_7$, $LiFeAs_2O_7$ and $LiVP_2O_7$ compounds, once synthesized, are each ground with carbon so as to improve the electrochemical activity of the active compound of a positive electrode. The active compound does however present the drawback of being in powdery form. Likewise, in the article by S. Patoux et al. ("Lithium Insertion into Titanium Phosphates, Silicates and Sulfates", Chem Mater. 2002. 14, 5057-5068), once synthesized, the $TiP_2O_7$ compound is ground in a ball mill with 16.67% by weight of carbon black, before being used in powdery form as positive electrode. Such a positive electrode presents the drawback of being in powdery form. Such a positive electrode fabrication process can however be used in the laboratory, but it is not possible to manufacture such an electrode on an industrial scale. Positive electrodes in powder form are in fact not at all practical to implement in lithium storage batteries manufactured in series and their manufacturing process requires two successive steps, respectively synthesis and grinding.

OBJECT OF THE INVENTION

The object of the invention is to provide a compound presenting properties that are suitable for use as active material of an electrode for a lithium storage battery.

According to the invention, this object is achieved by a compound containing titanium diphosphate and carbon, the titanium diphosphate being in the form of non-agglomerated particles and the carbon covering at least a part of said surface of said particles.

According to a development of the invention, the specific surface of the compound is greater than or equal to 6 $m^2/g$. More particularly, it is comprised between 6 $m^2/g$ and 14 $m^2/g$.

According to the invention, this object is also achieved by a preparation method of a compound containing titanium diphosphate and carbon, the process successively comprising at least:
    forming a mixture of at least a first precursor containing the titanium element with a +4 oxidation state, a phosphorus-base second precursor and an organic precursor containing the carbon element,
    and heat treatment of the obtained mixture at a temperature comprised between 500° C. and 800° C., in an inert atmosphere, said heat treatment causing decomposition of the organic precursor and formation of said compound.

According to a preferred embodiment, the organic precursor is chosen from carbohydrates. More particularly, it is chosen from starch, cellulose and their derivatives.

BRIEF DESCRIPTION OF THE DRAWINGS

Other advantages and features will become more clearly apparent from the following description of particular embodiments of the invention given for non-restrictive example purposes only and represented in the accompanying drawings, in which:

FIG. 8 represents the first charge/discharge cycles in intentiostatic mode, at 20° C. and at 55° C., of an electrode made of a compound containing $TiP_2O_7$ with 6.6% by weight of C, whereas

DESCRIPTION OF PARTICULAR EMBODIMENTS

Figure 1:
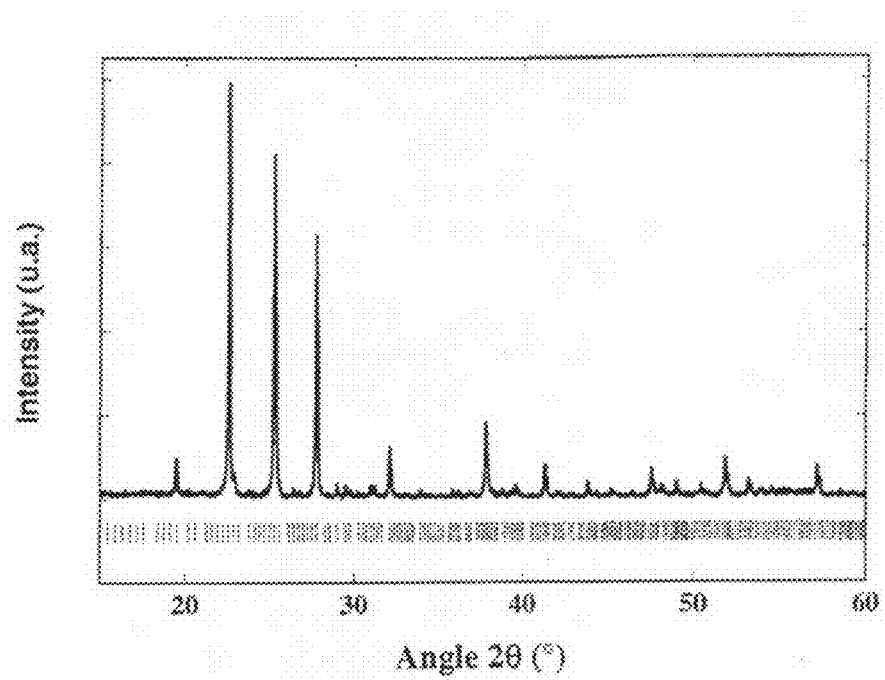
FIG. 1 represents a diffraction diagram of the X-rays ($\lambda_{CuK\alpha}$) of a particular compound according to the invention containing $TiP_2O_7$ and 4.4% by weight of C.

According to the invention, a compound containing titanium diphosphate $TiP_2O_7$ and carbon presents suitable properties for use as active material of an electrode for a lithium storage battery. Such a compound is more particularly a composite material in which $TiP_2O_7$ and carbon are intimately bonded, so that the carbon covers at least a part of the surface of the $TiP_2O_7$ particles.

The compound is therefore in the form of non-agglomerated particles of titanium diphosphate whose surface is at least partly covered with carbon. The particles of the compound are further preferably flattened particles having a mean length comprised between 5 and 10 micrometers and a mean height comprised between 0.2 and 1 micrometer.

The compound preferably comprises between 0.1% and 30% by weight of carbon and more particularly between 4% and 8% by weight of carbon and the specific surface of the compound is preferably greater than or equal to 6 $m^2/g$ and preferably comprised between 6 $m^2/g$ and 14 $m^2/g$.

Such a compound is more particularly obtained by a preparation method successively comprising:
    forming a mixture of least a first precursor containing the titanium element with a +4 oxidation state, a second precursor containing phosphorus and an organic precursor containing the carbon element,
    and heat treatment of the mixture obtained, at a temperature comprised between 500° C. and 800° C., in an inert atmosphere. The heat treatment then causes synthesis of the titanium diphosphate and formation of carbon on at least a part of the surface of the titanium diphosphate particles, by decomposition of the organic precursor.

The organic precursor is an organic compound that is able to decompose to form at least carbon during the heat treatment step. It is preferably chosen from carbohydrates such as starch, cellulose and their derivatives, for example carboxymethylcellulose, hydroxypropylmethylcellulose, cellulose acetate, etc.

The organic precursor is mixed with precursors of titanium diphosphate so as to form in situ, i.e. during synthesis of the titanium diphosphate, carbon covering at least a part of the synthesized titanium diphosphate particles. Decomposition of the organic precursor corresponds to calcination in an inert atmosphere enabling carbon to be formed and various gases such as CO, $CO_2$, aldehydes, etc. to be released.

Mixing of the titanium diphosphate precursors with the organic precursor can be of any type. It can for example be performed by dry mixing, for example by mechanosynthesis or by grinding in a mortar. It can also be performed in a solvent (for example hexane, heptane . . . ). The solvent is then evaporated at ambient temperature before the mixture undergoes heat treatment.

The titanium diphosphate precursors are formed by a first precursor containing the titanium element with a +4 oxidation state and by a second precursor containing phosphorus. Their proportions are preferably stoichiometric in the mixture with the organic precursor. The proportion of organic precursor in the mixture is for its part variable. The first precursor can be chosen from titanium oxide and titanium tetrachloride and the second precursor can be chosen from phosphoric acid $H_3PO_4$, ammonium hydrogenophosphate $(NH_4)_2HPO_4$ and ammonium dihydrogenophosphate $(NH_4)H_2PO_4$.

The heat treatment step is performed in an inert gas atmosphere, such as argon or nitrogen, at a temperature comprised between 500° C. and 800° C., and preferably between 580° C. and 680° C. The choice of temperature is more particularly determined by the organic precursor used and by the carbon content required in the obtained compound. Heat treatment has to be performed at a temperature less than or equal to 800° C. so as to avoid partial or total reduction of the $Ti^{4+}$ ions to $Ti^{3+}$ ions or formation of titanium phosphides ($TiP_x$). The duration of the heat treatment step is relatively short. It is preferably comprised between 15 minutes and 45 minutes. For example, the heat treatment step is achieved by a temperature rise chosen between 580° C. and 800° C. It has thus been observed that the $TiP_2O_7$/C compound is synthesized at 600° C., after only some ten minutes of treatment. It has also been observed that the higher the temperature, chosen between 580° C. and 800° C., the more the organic precursor decomposes and the more the carbon is conducting. On the other hand, the higher the temperature, the more the size of the $TiP_2O_7$/C compound grains increases. Determining the heat treatment temperature therefore corresponds to a trade-off between the conduction properties of carbon and the grain size.

Several compounds of $TiP_2O_7$/C type were produced for example purposes by a preparation method according to the invention.

EXAMPLE 1

A $TiP_2O_7$/C compound was achieved by mixing 10.805 grams of $TiO_2$ of anatase form with 31.110 grams of $NH_4H_2PO_4$ and 3 grams of cellulose in a Retsch type mill for five hours. The speed of rotation of the mill is 500 rpm, with an alternating direction of rotation. The grinding bowl, made of quartz with a capacity of 250 cm³, is filled in air and contains 13 grinding balls made of quartz with a diameter of 20 mm and each weighing 10.8 grams. The mixture is then treated at 700° C., in argon, for 30 minutes in a closed quartz tube.

At the end of the heat treatment, a $TiP_2O_7$/C compound containing 4.4% by weight of carbon is obtained. FIG. 1 corresponds to the diffraction diagram of the X-rays ($\lambda_{CuK\alpha}$) of the compound obtained according to example 1, the vertical peaks corresponding to the Bragg positions calculated for the space group Pa-3 and for a lattice parameter of 23.636 Angstroms.

Figure 2:
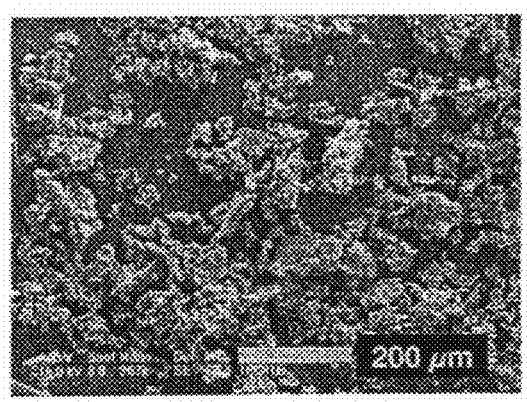
FIGS. 2 and 3 represent two photographs obtained by scanning electronic microscopy (SEM) of a particular compound according to the invention, containing $TiP_2O_7$ with 4.4% by weight of C, respectively with 267× and 10000× enlargements.
Figure 3:
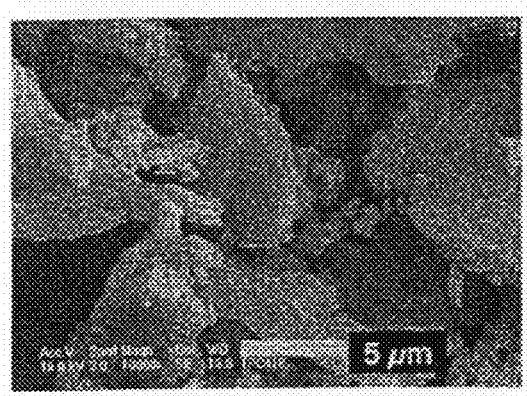

The specific surface of the compound obtained according to example 1 is 7.4 m²/g (±0.1 m²/g). It can further be observed, in FIGS. 2 and 3, that the particles obtained are non-agglomerated and flattened, with a diameter of about 5 µm and a height of about 1 µm.

Figure 4:
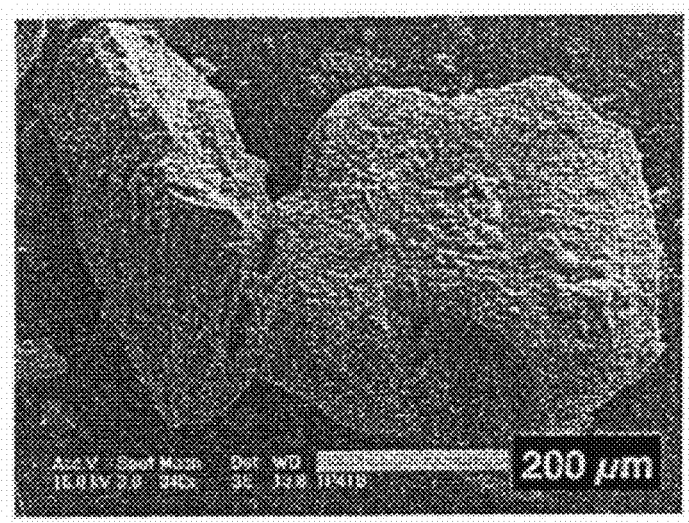
FIG. 4 represents a photograph obtained by scanning electronic microscopy (SEM) of $TiP_2O_7$ with an enlargement of 346×.

For comparison purposes, a compound containing only $TiP_2O_7$ was produced by reaction in solid state, in air, at a temperature of 1000° C. for 24 hours and from $TiO_2$ and $NH_4H_2PO_4$. The compound obtained presents a specific surface of only 1.1 m²/g (±0.1 m²/g), which is insufficient to obtain good electrochemical performances on account of the poor conductivity. In FIG. 4, it can also be observed that the particles of pure $TiP_2O_7$ are larger and more spherical than those obtained by the preparation method of example 1.

Figure 5:
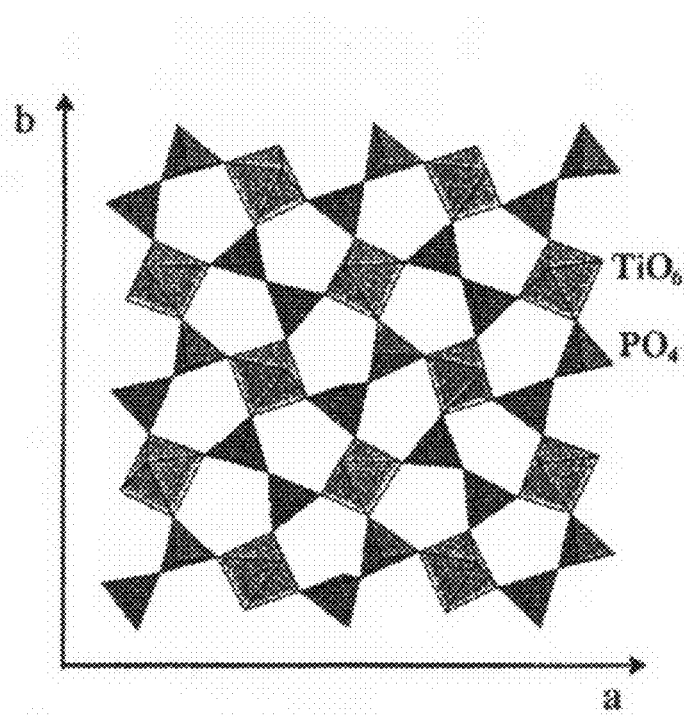
FIG. 5 represents the crystalline structure of $TiP_2O_7$ in the plane (a, b).

For information purposes, FIG. 5 represents the crystallographic structure of $TiP_2O_7$. Titanium diphosphate $TiP_2O_7$ presents a disordered cubic structure resulting from an overstructure of 3×3×3 type. The structure is thereby composed of diphosphate $(P_2O_7)^{4-}$ groups formed by $PO_4^{3-}$ tetrahedra and bonded to $TiO_6$ octahedra in a NaCl type arrangement. The arrangement of the polyhedra is identical in all three directions of space and is presented in FIG. 5 in the plane (a, b), a and b being the lattice parameters.

EXAMPLE 2

27.013 grams of $TiO_2$ of anatase form and 77.775 grams of $NH_4H_2PO_4$ are ground manually in a mortar with 7.5 grams of cellulose and 20 mL of hexane. After evaporation of the hexane, at ambient temperature under a hood, the mixture is then treated at 600° C., in argon for 40 minutes in a closed stainless steel tube. The compound obtained is a $TiP_2O_7$/C composite containing 5.2% by weight of carbon.

EXAMPLE 3

10.805 grams of $TiO_2$ of anatase form and 31.110 grams of $NH_4H_2PO_4$ are mixed with 3.3 grams of hydroxypropylmethylcellulose in a Fritsch type planetary mill for one hour. The speed of rotation of the mill is 200 rpm with an alternating direction of rotation. The grinding bowl, made of tungsten carbide and with a capacity of 250 cm³, is filled in air and contains 10 tungsten carbide grinding balls with a diameter of 20 mm weighing 62.4 grams each. The mixture is then treated at 650° C., in argon, for 15 minutes in a closed quartz tube. A $TiP_2O_7$/C compound containing 6.6% by weight of carbon was obtained.

EXAMPLE 4

A $TiP_2O_7$/C compound was obtained by mixing 1.801 grams of $TiO_2$ of anatase form with 5.185 grams of $NH_4H_2PO_4$ and 0.5 grams of cellulose in a Retsch type planetary mill for 15 minutes. The speed of rotation of the mill is 100 rpm with an alternating direction of rotation. The grinding bowl, made of quartz and with a capacity of 50 cm³, is filled in air and contains 15 quartz grinding balls with a diameter of 10 mm weighing 1.4 grams each. The mixture is then treated at 700° C., in argon, for 20 minutes in a closed quartz tube. A $TiP_2O_7$/C compound containing 4.6% by weight of carbon was obtained.

It can thus be observed that mixing an organic compound containing carbon with a precursor containing the titanium element in a +4 oxidation state, and performing heat treatment at a temperature comprised between 500° C. and 800° C. enables $TiP_2O_7$ to be synthesized in an unexpected and quick manner. This therefore enables the titanium element to be kept in a +4 oxidation state, which is particularly surprising in so far as carbon is known to act as reducer of the transition element present in one of the precursors. This is notably the case with LiFePO$_4$. Thus, the article by J. Barker et al. ("Lithium Iron(II) Phospho-olivines Prepared by a Novel Carbothermal Reduction Method", Electrochemical and Solid-State Letters, 6 (3), A56-A55 (2003)) describes preparation of LiFePO$_4$ and LiFe$_{0.9}$Mg$_{0.1}$PO$_4$ by a Carbothermal Reduction (CTR) Method. For LiFePO$_4$, the method consists in mixing a precursor containing the iron element in +3 oxidation state (Fe(III) or Fe$^{3+}$), for example Fe$_2$O$_3$, with a precursor containing the lithium element and the PO$_4^{3-}$ entity, for example LiH$_2$PO$_4$, and with carbon. The mixture is then subjected to heat treatment performed at a temperature of 750° C. for 8 hours. This method enables LiFePO$_4$ to be synthesized, reducing the Fe(III) element to Fe(II) and oxidizing the carbon into carbon monoxide (CO).

Furthermore, the preparation method according to the invention presents the advantage of performing the heat treatment at a relatively moderate temperature and preferably for a relatively short time. This prevents formation of phosphides, as is discussed in Patent application WO-A-2004/001881 where a LiFePO$_4$/C composite is synthesized from an organic precursor containing carbon.

Figure 6:
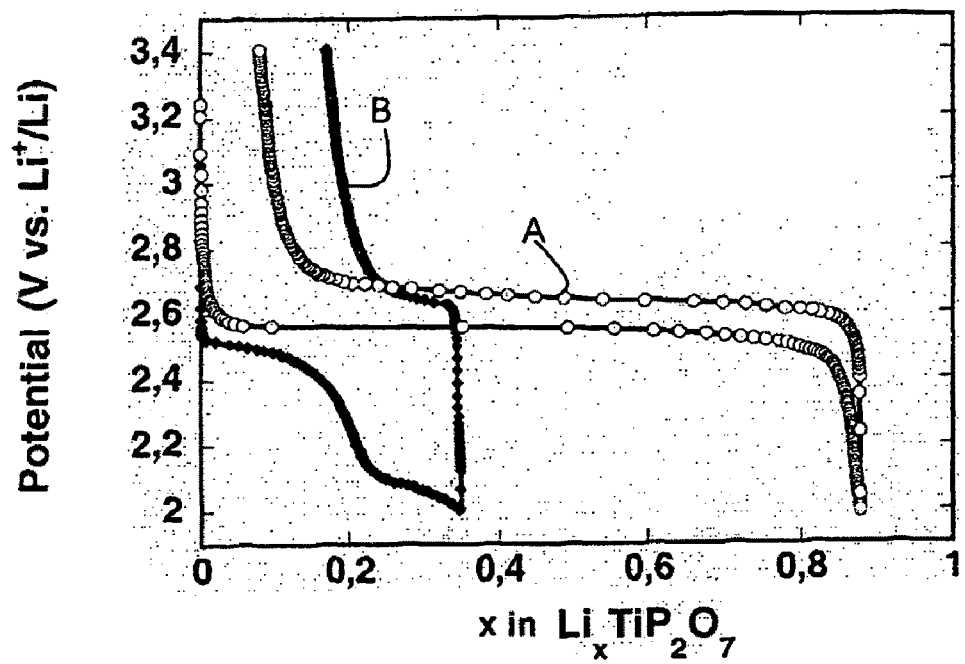
FIG. 6 represents the intentiostatic curves, at 20° C., of the first charge/discharge cycle, under C/10 conditions, of two compounds, respectively of $TiP_2O_7$ (curve A) and of $TiP_2O_7$ with 7.7% by weight of C (curve B).

Furthermore, the preparation method according to the invention, and in particular the fact that synthesis of titanium diphosphate is performed at a relatively moderate temperature and for a relatively short time, enables crystalline growth of TiP$_2$O$_7$ particles to be reduced. The TiP$_2$O$_7$ particles synthesized by the preparation method according to the invention are in fact hardly agglomerated or not agglomerated at all, they do not contain any impurities and above all they are of small size. This leads to the ionic conductivity being improved in comparison with pure TiP$_2$O$_7$ produced according to the prior art, since diffusion of the Li$^+$ ions in the core of the TiP$_2$O$_7$ grains is improved by shorter diffusion paths. In FIG. 6, curve A corresponds to the charge/discharge curve of the TiP$_2$O$_7$/C compound obtained according to example 2, whereas curve B corresponds to the charge/discharge curve of a TiP$_2$O$_7$ compound obtained according to the prior art and as represented in FIG. 4. The two compounds were tested under identical conditions in a lithium storage battery of "button cell" type. It is noted that the performances of the TiP$_2$O$_7$/C compound are substantially better than those of the pure TiP$_2$O$_7$ compound. The quantity of lithium exchanged in the TiP$_2$O$_7$/C compound is in fact twice that exchanged in the pure TiP$_2$O$_7$ compound and the polarization is substantially weaker in the TiP$_2$O$_7$/C compound than in the pure TiP$_2$O$_7$ compound.

Furthermore, as carbon is an electronic conductor, its presence at the surface of the TiP$_2$O$_7$ particles in the compound according to the invention enables the electronic conductivity of the TiP$_2$O$_7$ to be improved.

The TiP$_2$O$_7$/C compound is also a material that is able to insert and extract Li$^+$ ions to and from its structure. Thus, when a lithium storage battery is in operation, the reversible lithium insertion and extraction reaction into/from the TiP$_2$O$_7$/C compound is schematically the following:

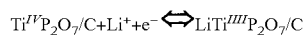

Figure 7:
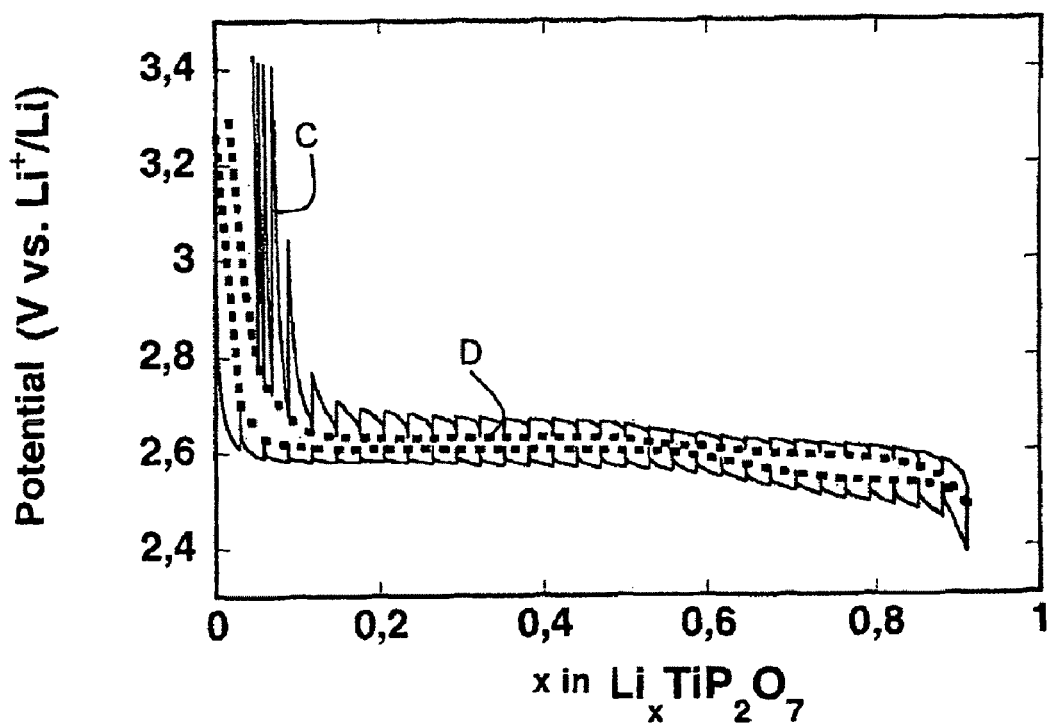
FIG. 7 represents curve of charge/discharge in intermittent galvanostatic mode (C/20 conditions, 20° C.) with open-circuit periods of two hours, on which the potential variation compared with the $Li^+/Li$ couple is plotted versus the proportion x of lithium inserted in a compound according to the invention containing $TiP_2O_7$ with 6.6% by weight of C.

FIG. 7 illustrates the potential variation of the (Ti$^{IV}$P$_2$O$_7$/C)/(LiTi$^{III}$P$_2$O$_7$/C) couple compared with the Li$^+$/Li couple versus the proportion x of lithium inserted in the TiP$_2$O$_7$/C compound obtained according to example 3 during charge/discharge operations in intermittent galvanostatic mode with C/20 conditions at 20° C. and with open-circuit periods of two hours. Unbroken line curve C represents the charge/discharge curve of the compound obtained in intermittent galvanostatic mode, whereas broken line curve D represents the curve at equilibrium and enables the open-circuit potential to be monitored. It can thus be observed that the lithium insertion (/extraction) reaction into (/from) the TiP$_2$O$_7$/C compound takes place at 2.62-2.55 V with respect to the Li$^+$/Li couple. It can also be observed that the polarization corresponding to the internal resistance of this system is relatively weak.

The TiP$_2$O$_7$/C compound according to the invention therefore presents properties that are particularly suitable for use as active material of an electrode for a lithium storage battery.

For Li-Metal lithium storage batteries, it is in fact desirable for the lithium insertion/extraction material to have the highest potential possible with respect to the Li$^+$/Li couple, so as to obtain a material able to insert lithium reversibly over a large number of cycles. However, said potential must not be too high either, as polymers which are unstable over 3.5V with respect to the potential of the Li$^+$/Li couple (ethylene polyoxide-base polymers for example) are generally used in this type of storage battery. A good trade-off is then a material having a mean potential of about 2.5V with respect to the potential of the Li$^+$/Li couple. Vanadium oxides for example meet these requirements, but vanadium is a toxic element. The TiP$_2$O$_7$/C compound, on account of its lithium insertion/extraction potential, is therefore a material able to replace vanadium oxides. It also presents the advantage of being non toxic, stable in cycling and of being inexpensive.

In Li/Ion type lithium storage batteries, the active material of the negative electrode must in principle present a lithium ion insertion potential that is not too high with respect to the Li$^+$/Li couple. The potential delivered by the storage battery does in fact correspond in this case to the potential difference between the respective active materials of the positive and negative electrodes. If the active material of the positive electrode has for example a material having a potential at 5V vs Li$^+$/Li, it is preferable for the active material of the negative electrode to have a potential of less than 3 V vs Li$^+$/Li, which is the case of the TiP$_2$O$_7$/C compound.

It is also possible, by means of this compound, to increase the temperature of use of lithium storage batteries using such a compound, which makes it particularly suitable for Li/Metal lithium storage batteries containing a polymer electrolyte. The operating temperature of such a storage battery is in fact at least 60° C.

Furthermore, the powdery compound obtained also presents the advantage of being able to be provided in the form of a film forming the electrode. The film can be formed by a metal support forming a current collector and coated with at least TiP$_2$O$_7$/C. More particularly, the powdery compound TiP$_2$O$_7$/C can be mixed with an electron conducting additive such as carbon black and/or with an organic binder such as polyether, polyester, a methyl methacrylate-base polymer, acrylonitrile, vinylidene hexafluoride etc., so as to form a composite film that can then be deposited on the metal support, for example made of aluminum.

Several lithium storage batteries were produced, for example purposes, using the TiP$_2$O$_7$/C compound according to the invention as active material of an electrode.

EXAMPLE A

A Li/Metal lithium storage battery in the form of a "button cell" was produced with:
a negative electrode made of lithium, having a diameter of 16 mm and a thickness of 130 μm, said electrode being deposited on a nickel disc acting as current collector,
a positive electrode formed by a disc with a diameter of 14 mm, said electrode being deposited on an aluminum current collector having a thickness of 20 μm. The disc is taken from a composite film having a thickness of 25 μm containing 80% by weight of the TiP$_2$O$_7$/C compound as prepared according to example 1. 10% by weight of carbon black and 10% by weight of polyvinylidene hexafluoride.

a separator imbibed with a LiPF$_6$ salt-base (1 mol/L) liquid electrolyte in solution in a mixture of ethylene carbonate and dimethyl carbonate.

Figure 8:
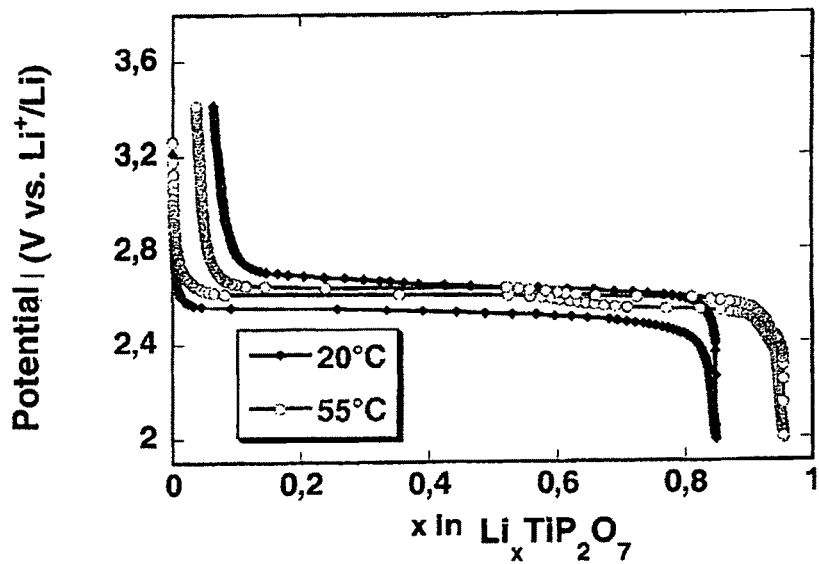
Figure 9:
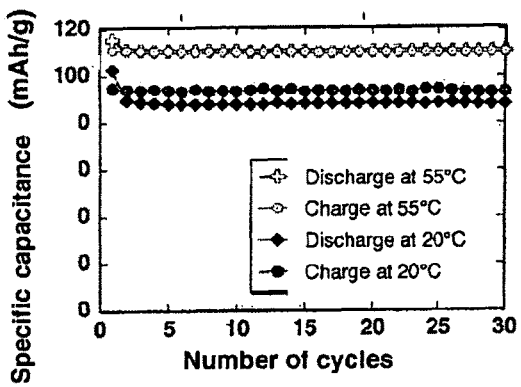
FIG. 9 represents the variation of the specific capacitance of such an electrode versus the number of cycles.

Such a lithium storage battery was tested in intensiostatic mode at 20° C. and at 55° C., in C/10 conditions (FIGS. 8 and 9). Although the electrochemical performances at 20° C. are satisfactory, the temperature increase to 55° C. enables even better performances to be obtained. The polarization is extremely weak and cycling resistance of the capacitance is not impaired by the temperature increase. At 20° C. and at 55° C., the capacitance is stable in cycling and the faraday efficiency is excellent. Under C/10 conditions, the lithium storage battery delivers a capacitance of 110 mAh/g that is perfectly stable in prolonged cycling.

EXAMPLE B

A Li/Metal lithium storage battery in the form of a "button cell" was produced with the same negative electrode and the same imbibed separator as those used in example A above.

The positive electrode is formed by a disc with a diameter of 14 mm and is deposited on an aluminum current collector having a thickness of 20 μm. The disc is taken from a composite film having a thickness of 50 μm containing 80% by weight of the TiP$_2$O$_7$/C compound as prepared according to example 3, 10% by weight of carbon black and 10% by weight of polyvinylidene hexafluoride.

Figure 10:
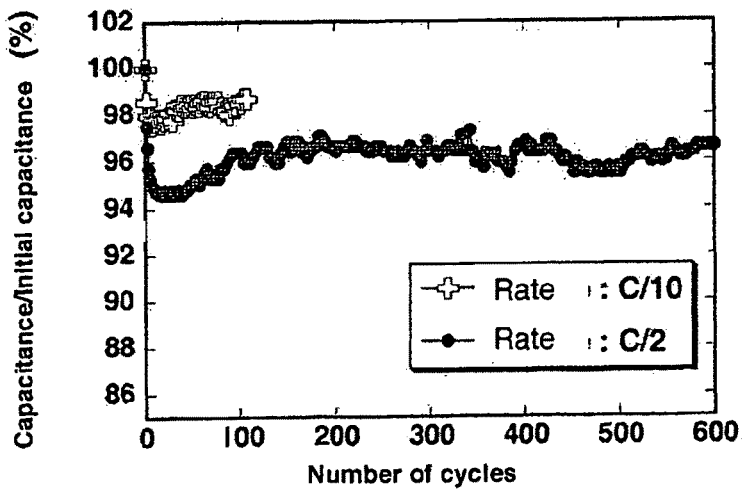
FIG. 10 represents the variation of the load capacitance compared with the load capacitance of the first cycle versus the number of cycles (intentiostatic cycling conditions: C/10 and C/2, with a cycling temperature of 20° C.) for a $TiP_2O_7$ compound with 6.6% by weight of C.

As represented in FIG. 10. at 20° C., under C/2 conditions, the lithium storage battery achieved in this way delivers a relatively stable capacitance over more than 600 cycles. It appears that in intensiostatic cycling, the capacitance drops slightly in the course of the first cycles then stabilizes perfectly. More than 600 cycles are for example obtained under C/2 conditions with a loss of capacitance of less than 4%. The TiP$_2$O$_7$/C compound is thus stable in prolonged cycling and the reactivity with respect to the electrolyte, in particular with respect to the cycling potential, is almost inexistent, which implies that there is no impairment of the electrolyte or of said compound.

EXAMPLE C

A Li/ion lithium storage battery was produced from a negative electrode containing the TiP$_2$O$_7$/C compound according to example 2, a positive electrode containing the LiNi$_{0.5}$Mn$_{1.5}$O$_4$ compound and a separator such as the one marketed under the name of Celgard 2400 and imbibed with a LiPF$_6$ salt-base (1 mol/L) liquid electrolyte in solution in a mixture of propylene carbonate, dimethyl carbonate and ethylene carbonate. Each of the electrodes is made up of a mixture formed by 80% by weight of active material (TiP$_2$O$_7$/C for the negative electrode and LiNi$_{0.5}$Mn$_{1.5}$O$_4$ for the positive electrode), 5% by weight of carbon black, 5% by weight of carbon fibers and 10% by weight of polyvinylidene hexafluoride. Such a mixture is deposited on an aluminum current collector.

At 25° C., the storage battery produced in this way enables exchange of almost one mole of Li$^+$ ions per TiP$_2$O$_7$ mole in the 0.9-2.4 Volts potential range with respect to the TiP$_2$O$_7$/LiTiP$_2$O$_7$ system. The mean potential of such a storage battery is about 2.05-2.10 Volts.

The liquid electrolyte used in examples A to C can be replaced by any known type of electrolyte. It can for example be formed by a salt containing at least the Li$^+$ ion. The salt can for example be chosen from LiClO$_4$, LiAsF$_6$. LiPF$_6$. LiBF$_4$, LiRFSO$_3$. LiCH$_3$SO$_3$. LiN(RFSO$_2$)$_2$. LiC(RFSO$_2$)$_2$. LiTFSI, LiBOB, and LiBETI. R$_F$ is chosen from a fluorine atom and a perfluoroalkyl group containing between 1 and 8 carbon atoms. LiTFSI is the acronym for lithium trifluoromethanesulphonylimide, LiBOB is the acronym for lithium bis(oxalato)borate and LiBETI is the acronym for lithium bis(perfluoroethylsulfonyl)imide. In the case of a Li/Ion storage battery, the salt is preferably dissolved in an aprotic polar solvent such as diethylene carbonate, propylene carbonate, dimethyl carbonate, diethyl carbonate, ethyl methyl carbonate, etc., and can be supported by a separating element arranged between the two electrodes of the storage battery. In the case of a Li/Metal storage battery, the salt is not dissolved in an organic solvent but in a solid polymer conducting Li$^+$ ions, such as polyoxy ethylene (POE), polyacrylonitrile (PAN), polymethyl methacrylate (PMMA), polyvinylidene fluoride (PVdF) or a derivative of the latter.

The invention claimed is:

1. A preparation method of a compound containing titanium diphosphate and carbon, successively comprising:
    forming a dry, powdery mixture of at least a first precursor containing a titanium element with a +4 oxidation state, a second precursor containing phosphorus and an organic precursor containing a carbon element, and
    heat treating the dry, powdery mixture, at a temperature of between 500° C. and 800° C., in an inert atmosphere, said heat treatment causing decomposition of the organic precursor and formation of said compound.

2. The method according to claim 1, wherein the organic precursor is selected from the group consisting of carbohydrates.

3. The method according to claim 2, wherein the organic precursor is selected from the group consisting of starch, cellulose and their derivatives.

4. The method according to claim 1, wherein the first precursor is selected from the group consisting of titanium oxide and titanium tetrachloride.

5. The method according to claim 1, wherein the second precursor is selected from the group consisting of phosphoric acid, ammonium hydrogenophosphate and ammonium dihydrogenophosphate.

6. The method according to claim 1, wherein the first and second precursors are in stoichiometric proportions in the mixture with the organic precursor.

7. The method according to claim 1, wherein the mixture is made dry.

8. The method according to claim 1, wherein the mixture is made in a solvent, said solvent being evaporated at ambient temperature before the heat treatment is performed.

9. The method according to claim 1, wherein the heat treatment is performed for a time comprised between fifteen minutes and forty-five minutes.

10. The method according to claim 1, wherein the temperature of the heat treatment is comprised between 580° C. and 680° C.

11. The method according to claim 1, wherein the compound containing titanium diphosphate and carbon is a non-agglomerated compound.

12. The method according to claim 11, wherein the compound containing titanium diphosphate and carbon has a surface that is at least partly covered with carbon.

13. The method of claim 1, further comprising forming an active material of an electrode for a lithium storage battery from the compound.

* * * * *